United States Patent [19]

Nystrom

[11] 3,718,325

[45] Feb. 27, 1973

[54] REPAIR CLAMP FOR SPRING

[76] Inventor: Donald L. Nystrom, 344 Dutch Rd., Fairview, Pa. 16415

[22] Filed: July 17, 1970

[21] Appl. No.: 55,658

[52] U.S. Cl. ................................................267/74
[51] Int. Cl. ...............................................F16f 1/12
[58] Field of Search....................267/74, 73, 177, 179

[56] References Cited

UNITED STATES PATENTS

| | | | |
|---|---|---|---|
| 2,700,788 | 2/1955 | Hennelly | 267/179 |
| 2,480,864 | 9/1949 | Loepsinger | 267/177 |
| 1,095,641 | 5/1914 | Johnson | 267/179 |
| 2,265,629 | 12/1941 | Chistiansen | 267/74 |
| 1,047,491 | 12/1912 | Bliss | 267/74 |
| 739,035 | 9/1903 | Triner | 267/74 |

Primary Examiner—James B. Marbert
Attorney—Charles L. Lovercheck

[57] ABSTRACT

The specification discloses an adapter for a helical spring. The adapter is made up of a plug having an external spiral groove defined by a spiral ridge. The groove receives an end of the spring. The spring is clamped to the plug by means of a clamp such as a hose clamp. The plug has an eye bolt attached to it whereby the spring can be attached to a device to be supported.

3 Claims, 4 Drawing Figures

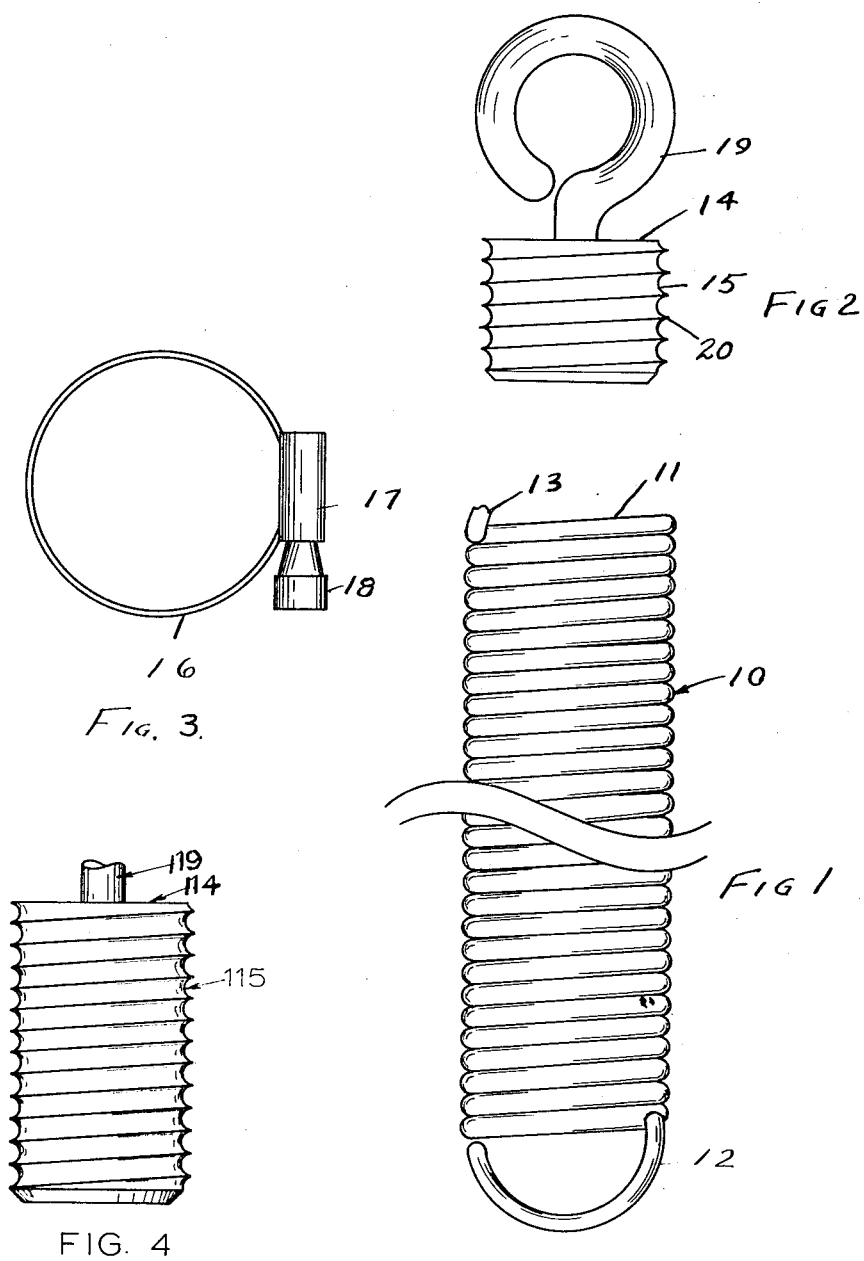

3,718,325

REPAIR CLAMP FOR SPRING

STATEMENT OF INVENTION

This invention relates to springs and, more particularly, to repair adapters for helical springs.

OBJECTS OF THE INVENTION

It is an object of the invention to provide an adapter for repairing helical springs.

Another object of the invention is to provide an extension for broken helical springs.

Another object of the invention is to provide an adapter for helical springs having a threaded helical groove with mating pitch in the outside thereof to receive the inside of the spring.

Another object of the invention is to provide a combination adapter and clamp arrangement for repairing a spring.

Another object of the invention is to provide an improved adapter and clamp in combination with a helical spring.

DESCRIPTION OF THE DRAWINGS

FIG. 1 is a view of the spring according to the invention.

FIG. 2 is a view of the adapter for use with a spring such as shown in FIG. 1.

FIG. 3 is a view of the clamp for use in combination with the adapter.

FIG. 4 is a broken view of another embodiment of the invention, similar to FIG. 2.

DETAILED DESCRIPTION OF THE DRAWINGS

Now with more particular reference to the drawings, the drawing shows a helical spring 10 with a hook 12 on one end and made of a helical rod terminating at a second end 13. An adapter is made of a plug 14 which has a helical groove 15 in its outer periphery which may be screwed into the end of the spring adjacent the end 13. The groove 15 is defined by the sharp helical ridge 20. An eye bolt 19 may be threaded into the plug. When the plug is in place, the clamp 16 is clamped around the outside of the spring to hold it firmly in the helical groove 15 of the plug. The clamp is held by a worm 17 which has a handle 18 on it by which the clamp may be tightened.

FIG. 4 shows a view similar to FIG. 2 of another embodiment of the plug 114 which has an eye bolt 119 threadably received in it and has an outer peripheral groove 115 for receiving the turns of a helical spring such as 10 in FIG. 1.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a helical spring and an adapter,
    said helical spring being formed of a rod formed into a helix terminating in a first end and a second end,
    a hook on said first end,
    a plug,
    said plug having a helical groove formed on its outer periphery,
    said plug being screwed into one end of said spring,
    said helical groove receiving said rod,
    said groove being defined by a sharp helical shaped ridge,
    said ridge being received between said turns of said rod on said second end,
    and means on said plug for attaching it to a device to be supported,
    said means on said plug comprises an eye bolt threadably received in said plug.

2. The combination recited in claim 1 wherein a clamp is disposed around said spring,
    said clamp having a tightening device thereon,
    said tightening device comprising a worm gear and a handle.

3. In combination, a repair clamp for a spring having a broken end and a spring,
    a helical spring and an adapter,
    said helical spring being formed of a rod formed into a helix terminating in a first end and a second end,
    a hook on said first end,
    a plug,
    said plug having a helical groove formed on its outer periphery,
    said plug being screwed into said second end of said spring,
    said helical groove receiving said rod,
    said groove being defined by a sharp helical shaped ridge,
    said ridge being received between said turns of said rod,
    and means having an eyelike member on said plug for attaching it to a device to be supported.

* * * * *